(12) United States Patent
Skaug et al.

(10) Patent No.: US 7,221,121 B2
(45) Date of Patent: May 22, 2007

(54) FREQUENCY CONVERTER FOR DIFFERENT MAINS VOLTAGES

(75) Inventors: Kenneth Skaug, Hoejbjerg (DK); Michael Toennes, Soenderborg (DK); Nils-Ole Harvest, Nordborg (DK); Egon Krogh, Soenderborg (DK); Andreas Aupke, Egernsund (DK)

(73) Assignee: Danfoss Drives A/S, Graasten (DE)

( * ) Notice: Subject to any disclaimer, the term of this patent is extended or adjusted under 35 U.S.C. 154(b) by 0 days.

(21) Appl. No.: 10/495,854

(22) PCT Filed: Nov. 21, 2002

(86) PCT No.: PCT/DK02/00785

§ 371 (c)(1),
(2), (4) Date: Oct. 25, 2004

(87) PCT Pub. No.: WO03/044939

PCT Pub. Date: May 30, 2003

(65) Prior Publication Data

US 2005/0068001 A1 Mar. 31, 2005

(30) Foreign Application Priority Data

Nov. 23, 2001 (DK) .................. 2001 01750
Nov. 23, 2001 (DK) .................. 2001 01751

(51) Int. Cl.
*H02P 23/00* (2006.01)
*H02P 25/00* (2006.01)
*H02P 27/04* (2006.01)

(52) U.S. Cl. ............... 318/807; 318/727; 318/767; 318/800; 318/811

(58) Field of Classification Search ............... 318/138, 318/254, 430–434, 268, 439, 800–811, 286, 318/727, 767
See application file for complete search history.

(56) References Cited

U.S. PATENT DOCUMENTS 4,139,885 A * 2/1979 Overzet et al. ............... 363/58

(Continued)

FOREIGN PATENT DOCUMENTS

EP 0 431 563 A2 6/1991
EP 0 695 024 A2 1/1996

(Continued)

OTHER PUBLICATIONS

A. Boglietti et al., "Electrical Drives to Increase the Fluid Processing Efficiency", © 2001 IEEE, pp. 1147-1154, Dipartimento di Ingegneria Elettrica Industriale, Politecnico di Torino, C.so Duca degll Abruzzi, 24-10124 Torino, Italy.

*Primary Examiner*—Lincoln Donovan
*Assistant Examiner*—Tyrone Smith
(74) *Attorney, Agent, or Firm*—McCormick, Paulding & Huber LLP

(57) ABSTRACT

The invention is directed to controlling an electric motor by means of a frequency converter. The frequency converter can be connected to one of several different mains voltages. According to the present invention, the maximum output power of the frequency converter, is limited when the actual mains voltage is lower than the maximum nominal mains voltage, for which the frequency converter is designed, and during the limitation the frequency converter controls the speed of the motor within a power range up to a limited maximum output power. This gives a genuine multi-voltage unit, which can be connected to a wide range of mains voltages.

25 Claims, 7 Drawing Sheets

U.S. PATENT DOCUMENTS

| | | | |
|---|---|---|---|
| 4,525,660 A | | 6/1985 | Katto |
| 4,538,100 A | * | 8/1985 | Tuten et al. ................ 318/808 |
| 4,656,571 A | | 4/1987 | Umezu |
| 4,855,652 A | * | 8/1989 | Yamashita et al. .......... 318/268 |
| 5,045,988 A | * | 9/1991 | Gritter et al. ................. 363/35 |
| 5,089,760 A | * | 2/1992 | Joyner, Jr. .................. 318/798 |
| 5,163,172 A | * | 11/1992 | Hakala ....................... 324/111 |
| 5,793,623 A | * | 8/1998 | Kawashima et al. ..... 363/56.05 |

FOREIGN PATENT DOCUMENTS

| | | |
|---|---|---|
| EP | 0 837 549 A2 | 4/1996 |
| EP | 1 111 766 A1 | 6/2001 |
| GB | 2 167 252 A | 5/1986 |
| GB | 2 281 825 A | 3/1995 |
| WO | WO 97/36777 | 10/1997 |
| WO | WO 99/41830 | 8/1999 |

* cited by examiner

FREQUENCY CONVERTER FOR DIFFERENT MAINS VOLTAGES

CROSS-REFERENCE TO RELATED APPLICATIONS

This application is entitled to the benefit of and incorporates by reference essential subject matter disclosed in International Application No. PCT/DK02/00785 filed on Nov. 21, 2002, Danish Patent Application No. PA 2001 01750 filed on Nov. 23, 2001 and Danish Patent Application No. PA 2001 01751 filed on Nov. 23, 2001.

FIELD OF THE INVENTION

The invention concerns a frequency converter, which can be connected to one of several different mains voltages, and a method for speed control of an electric motor by means of a frequency converter.

BACKGROUND OF THE INVENTION

Differences in the mains voltages in the USA and Europe increase the production costs, as product differentiation is required. For years, therefore, it has been known to make frequency converters, which can be connected to different mains voltages, see for example U.S. Pat. No. 4,656,571.

However, this gives rise to a problem, when a frequency converter is connected to a mains voltage, which is lower than the maximum nominal mains voltage, for which the frequency converter is designed to handle. In this case the current in the unit will be increased in order to maintain the same electrical power output to the motor. The increased current may damage the frequency converter. To avoid this, the frequency converter can be designed for the high current, but this is an expensive solution, which will also require more room, because, for example, the intermediary circuit coil gets bigger. Thus, protection of the frequency converter is required.

Reduction of the current flowing in a frequency converter is known from EP 0 431 563 B1, however, in another connection. When the load, that is, the motor which is here used in a compressor for an HVAC system, consumes too much current, a control device reduces the output frequency of the inverter. The amplitude of the current is detected by a current measurement on the mains side, that is, before the frequency converter. When the output frequency is reduced, the current flowing to the rectifier from the mains is reduced, and thus the installation in private homes is protected against over current. However, the frequency converter described is not intended for connection to one of several different mains voltages.

A mains voltage self-adapting frequency converter is described in the U.S. Pat. No. 4,656,571 mentioned above. In front of the rectifier a voltage detector is placed, which gives information to a control device about the amplitude of the mains voltage. The control device comprises a memory element, in which a table for every possible mains voltage is stored. Each table again contains a number of U/f relations, known per se as the relation between the motor voltage and motor frequency applied by the inverter. To obtain an optimum motor operation, this relation must be kept constant. There are tables containing the U/f relations for mains voltages of 100V, 115V, 200V and 230V, and the output power of the frequency converter is regulated to a constant value by selecting the suitable U/f relations. In this solution, it is endeavoured to keep the intermediary circuit voltage constant, and for this purpose the input circuit contains a switch arrangement, which switches to voltage doubling mode when the unit is connected to 115V, whereas the switching device remains unchanged when connecting the unit to 230V. Thus, the motor receives the same voltage, but this system has the disadvantage that with a 115V mains voltage the input circuit has to sink a higher current. The complete input circuit has to be dimensioned for the lowest mains voltage, meaning that with the higher mains voltages the components will be substantially overdimensioned. A further problem with this design is that non-standard voltages are not considered. It is thus unclear, how the control device will handle a voltage supply drop from 230V to 170V. A stepless operation is not described.

Self-adaptation of a frequency converter should not be limited to adapting to the mains voltages. Also, adaptation of current limits is of interest. Today, a frequency converter typically contains three current limits, the upper limit being a short-circuiting protection, which is activated at a current of 300% of the nominal frequency converter current, and has a response time of 1 to 2 μs. This limit is activated when earthing or a short-circuit appears between the phase windings. The second limit is the hardware limit, which is typically at a current of 220% with a response time of 15 μs. The hardware limit is an expression of the maximum current, which semiconductors and coils of the frequency converter can stand. The short-circuit limit and the hardware limit are realised with electronic components, whereas the third limit, the software limit, is controlled by the program of the frequency converter. A typical software limit is 160% current for 60 seconds, after which the frequency converter reduces the load by lowering the motor frequency.

Normally, the hardware current limit is locked in the frequency converter already during manufacturing, but U.S. Pat. No. 4,525,660 discloses an over current circuit, in which the current limit is variable during operation. One input of a comparator here receives a current measuring signal from a current measured in the intermediary circuit or on the motor lines, the other input receives a current reference signal, which changes in dependence of the voltage-frequency ratio (U/f) of the frequency converter. When the current measuring signal exceeds the current reference, the comparator sends a signal in order to reduce the current or fully stop the frequency converter. The variable current reference signal consists of two contributions, a first fixed contribution being set by means of a potentiometer and a second contribution being determined as a function of the U/f ratio. The second contribution is found by means of a lookup table or a function calculation, the U/f ratio being the entry key and the current limit contribution increases with increasing U/f. Thus, the resulting current reference signal changes during operation of the frequency converter. However, this circuit has the disadvantage that the variation of the current limit is locked to the U/f ratio, which alone determines the characteristic, that is, the curve profile, of the current reference.

WO 97/36777 also describes a circuit for generating current references, which change during operation of a motor control, and the change takes place as a function of the speed of a vehicle. A current reference generator generates a hardware limit value by means of a table in a memory element comprising combinations of speed and current, while a microprocessor forms a software current limit. Via data lines, the microprocessor is connected with the memory element of the current reference generator, thus being able to change the profile of the hardware characteristic. Compared with U.S. Pat. No. 4,525,660, the circuit has the advantage that the current limit characteristic can be changed merely by changing the programming of the microprocessor. This gives the manufacturer a larger degree of freedom. Larger degrees of freedom are particularly desirable, when the manufacturer wants to make a general purpose motor drive, which can be used for different sizes of motors. A typical problem is the series-manufactured high-power frequency converter being connected to a low-power motor. The hardware current limit of the frequency converter is then locked and too high in relation to the motor. A further degree of freedom is desirable with regard to application areas, that is, areas in which the frequency converter is used. For example, HVAC (Heating, Ventilation, AirConditioning) and conveyor belt applications have different current limit profiles, but usually they are fixed in the frequency converter already during manufacturing. Thus, the frequency converter manufacturer is forced to have many variants, each having its particular hardware current limit.

SUMMARY OF THE INVENTION

Based on the above, the object of the invention is to design a general purpose frequency converter, which electrically can adapt, or can easily be adapted, to its surroundings.

According to the invention, this task is solved by a method where a DC/DC converter placed between a rectifier and an inverter is regulated to output a DC voltage that is kept constant during operation at each one of the several mains voltages, that a limit value signal is compared with one ore more measured or calculated parameters, that a control device limits the maximum output power by reducing the motor frequency generated by the inverter, and that the frequency converter, during a limitation of an output power of from the inverter, controls the speed of the electric motor within a power range up to the limited maximum output power.

This solution provides a universally applicable frequency converter, which can, in principle, be connected to a wide, continuous spectre of mains supply voltages. The frequency converter adapts automatically to the available mains voltage by limiting the output power in dependence of the mains voltage to which the frequency converter is connected. If the frequency converter e.g. is designed for a maximum nominal mains voltage of 230V, which will appear from the specifications of the motor controller, the control device will reduce the output power when connected to an actual mains voltage of 115V. More accurately, the control device will limit the maximum output power, so that the frequency converter is moved from one expected working point to another, after which the frequency converter will continue working in the new working point. The invention is applicable both in the situation where the frequency converter is initially connected to a mains having a lower initial voltage and working for the rest of the operation period with this voltage, and in the situation where a drop in the mains supply voltage occurs during an operation period. Throughout the duration of this lower voltage, the maximum output power is limited, until the mains supply voltage reaches its nominal value again. In this way, the control device protects the frequency converter against a too high current, and the result is a universally applicable motor controller. Even though the motor is derated, it will in many cases be more practical for both the OEM manufacturer and the end user only to have to handle one type of frequency converters and motors in his warehouse. Independently of the kind of limit value used, the output power of the inverter can be reduced by reducing the motor frequency. The motor frequency is the frequency applied by the inverter, and is, in a manner known per se, in direct relation to the speed of the motor. As the power consumption for e.g. a pump or a fan motor is proportional with the speed in the $3^{rd}$ power, a reduction of the motor frequency will have a clear effect on the power consumption and thus on the current consumed by the frequency converter. Instead of using a controlled rectifier, which is typically used with multi-phase mains supplies, this invention uses a boost converter arranged after the rectifier, the output voltage of the boost converter being controlled by the control device to be constant. Keeping the DC voltage constant in the intermediate circuit during operation at one of the several mains voltages gives robustness towards sudden changes in the mains voltages and provides a well defined design platform with the possibility of using lower rated components due to the inventive power limitation. This especially applies when the DC voltage has the same constant amplitude at different mains voltages. This gives the advantage of the full speed range independent of the amplitude of the mains voltage. Another variant is changing the amplitude of the DC voltage in dependence of the different mains voltages, but still keeping the DC voltage constant during operation. The DC/DC converter, preferably a boost converter, offers in a known manner power factor control and intermediary circuit voltage control in one.

The method according to the invention offers large advantages in areas with socalled weak mains, that is, islands, where the amplitude of the mains voltage is particularly sensitive towards the amperage drawn. Imagining that a frequency converter according to the state of the art is connected between a motor and a weak mains, and the weak mains has a lower voltage than expected, this will cause an increased current sink from the mains, which again results in a voltage drop, etc. The invention breaks this negative circle, as the reduction of the inverter output power prevents a further reduction of the mains voltage. Thus, the invention contributes to increased operational reliability.

In principle, the control device can reduce the output power by a predetermined fixed value, if the actual mains voltage is lower than the maximum nominal mains voltage, for which the frequency converter is dimensioned. The control device can then be informed of the amplitude of the mains voltage via a setting, which the user makes when commissioning the unit. However, it is preferred that the control device performs an independent and automatic adaptation of the frequency converter to the mains voltage, and therefore the control device contains a limit value, which is compared with one or several measured or calculated motor control parameters, for example the rectifier current. If the result of the comparison gives that the measured or calculated parameter is higher than the limit value, the output power is reduced.

The reduction of the output power can take place shortly after connecting the frequency converter to the mains. If, at the end of the starting period, the measured or calculated parameter is higher than the limit value, the control device limits the maximum output power of the frequency converter and, in principle, maintains this new value throughout the remaining operation period. With this immediate determination of the maximum permissible output power it is avoided that the control device has to use calculation power during operation.

Instead of using only one limit value, different limit values can be stored in a table, from which the control device selects one on the basis of one or more measured or calculated parameters. For example, the size of the limit value can vary with the temperature measured near the semi-conductors.

A particularly accurate formulation of the limit value can be obtained by making the control device calculate or determine the limit value continously during operation. Even though this requires calculation power, this is compensated by increased performance because the frequency converter will work in its optimum working point at the mains voltage in question. In other words, the motor is controlled so that it supplies the maximum acceptable power at a given mains voltage.

Advantageously, the limit value can be expressed as a current limit, for example, by the current in a motor phase or—which is preferred—by the current flowing after the rectifier. Due to the interrelation between motor frequency and input current—higher frequency causes higher current—it is expedient to let the current limit be a function of the motor frequency, possibly combined with a measured temperature.

The reduction of the motor frequency is made by creating a frequency difference between a desired motor frequency and a frequency-damping term, the frequency-damping term being calculated on the basis of the difference between the measured or calculated parameter and the limit value. The frequency difference is then led on to the inverter as a reference signal.

The control is mainly based on a U/f control, meaning that a reduction of the frequency f will also cause the motor voltage U to drop, because it is desired to keep the relation U/f constant to ensure correct magnetisation.

With a lower motor voltage, it is possible to reduce the intermediary circuit voltage. This reduction is done by the DC/DC converter, and after this reduction the intermediary voltage will again be kept constant during the operation. The advantage of the reduction of the intermediary circuit voltage is that less heat generating electrical power is deposited in the intermediary circuit components, which results in a reduced thermal load.

The mains voltage can be measured directly by means of a voltage sensor on the input of the rectifier, but it is also possible to get an indirect expression of the amplitude of the mains voltage by arranging current sensors in the intermediary circuit of the frequency converter.

By inserting a measuring resistor between the rectifier and the boost converter and a measuring resistor between the boost converter and the inverter two current values are obtained which can be compared to two limit values. The first limit value is compared to the current in the rectifier, and determines when the output power of the inverter should be lowered. The second limit value is compared to the current in the inverter and relates to the over current protection of the inverter. Advantageously, the second limit value is made variable as a function of the nominal power rating of the motor, the actual motor frequency or the torque load on the motor shaft.

The invention also relates to a frequency converter for speed controlling an electric motor. The frequency converter according to the invention comprises a boost converter between rectifier and inverter, which boost converter generates a DC voltage which is kept constant during operation at each one of the several mains voltages, and further comprises a control device which lowers the output power of the frequency converter by means of a first limit value as already described in order to adapt to the mains voltage, but additionally to the first limit value a second limit value is introduced which represents the hardware current of the inverter and which is adjustable during operation of the frequency converter. The second limit value is compared to a current measuring signal and an over current signal is given once the current measuring signal exceeds the second limit value.

In this way a universally applicable frequency converter can be designed. On the mains supply side, the frequency converter adapts to the available mains voltage by limiting the maximum output power, whereas on the motor side the frequency converter adapts to the motor by varying the limit value of the over current signal in accordance with the motor size, the motor frequency or the load connected with the motor shaft.

Preferably, the second limit value is generated on the basis of a reference characteristic stored in a memory. By enabling the current reference characteristic to depend on different variables, the desired degree of freedom for the frequency converter manufacturer is obtained. The current reference characteristic is almost completely open for modifications, as one characteristic with a first variable can be replaced by another characteristic with a second variable. One can have one frequency converter, which is adapted to the motor size, or one can have one power part comprising, among other things, the inverter, the same power part being applicable for different sizes of frequency converters. The only part to be replaced is the control part, which is then programmed with exactly the current limit applying for the power part in question. Even though the power part components will in many cases be overdimensioned in relation to the motor, for example a 250 W frequency converter with a connected motor of 150 W, it is cheaper for the frequency converter manufacturer to have few variants. Large-scale advantages and flexibility are achieved, because the adaptation can take place at manufacturing, or at the OEM manufacturer or at the end-users place. The current reference characteristic is stored in a memory element, and the replaceability of the characteristic gives the desired flexibility. Thus, in one variant one can program one characteristic, which is dependent on one or two variables, while in another variant one can program another characteristic dependent on two other variables. The characteristic can be formulated in dependence of many variables and be expressed as any function in a formula or in a table. The characteristic can e.g. be stored as a fixed characteristic in the microprocessor program—if desired, several selectable characteristics. The second limit value is pulse-width modulated and generated by the reference generator. This gives a simple and accurate control of the signal. This has the further advantage that, besides the short-circuit limit, the frequency converter can work with only one additional current limit, because the software current limit and the hardware current limit have been combined to one. This means a reduction of the required number of components.

These variables can be chosen from the control parameters as motor frequency, U/f ratio and temperature, or from the application parameters as motor size or load torque characteristic. If for example the temperature is chosen as input variable, the second limit value will decrease with increasing temperature. Alternatively, the current limit can be formulated as a function of both a control parameter and an application parameter.

The control and application parameters, or a mix of same, are sent as input signal to the reference generator, which is made as an FPGA (Field Programmable Gate Array), ASIC (Application Specific Integrated Circuit), DSP (Digital Signal Processor) or a microprocessor.

It is preferred that at least the motor frequency is used as a variable in the characteristic, as the motor frequency is a good expression of the current in the frequency converter and motor. Typically, it applies that increasing frequency gives increased current, and different current limits belong to different frequencies.

If the current reference characteristic is formulated with both temperature and motor frequency as variables, a particularly accurate expression of the hardware current limit is achieved.

One problem is that the current generated with a blocked rotor is approximately equal to the starting current of the motor. Therefore, the over current circuit can normally not distinguish between the two situations, but varying the second limit value so that the level is increased from the start up to a limit frequency and then is reduced again, a possible wrong detection is avoided. For a short while, the hardware current limit is simply increased above the amplitude of the starting current.

Before comparison, the pulse-width modulated signal should be converted to an analog signal, and this is most easily done by means of a low-pass filter. The comparison of the measured current and the current reference should be made with analog technique to achieve the required speed.

The control and/or application parameters meant to form the basis of the current reference characteristic will mainly be determined during manufacturing of the frequency converter, but can also be made selectable by the user, for example, an OEM customer setting dip-switches or jumpers arranged in the frequency converter or programming the frequency converter by means of serial communication, for example by using a PLC.

Alternatively, the frequency converter itself can adjust the current reference characteristic. The frequency converter measures the motor, determines its electrical parameters and calculates the motor size. Automatic parameter measurement is known from the state of the art and is usually made before starting the motor.

Advantageously, the current signal measured by the frequency converter is standardised with a standardising circuit, so that the control does not have to know the absolute value of the current. This means that the same control can be used for different sizes of frequency converters.

In the type of frequency converters, in which the power part and the control part are separated and placed on two different printed circuit boards, the standardising circuit can be arranged on either of these cards. This again means that e.g. identical power parts can be used for different control cards or identical control cards can be used for different power cards, as, in a manner of speaking, all adaptational functionality is placed on the control card. It is preferred that the standardising circuit is arranged on the power part.

The standardising circuit can be made in a simple manner by a parallel connection of two serially connected resistors with a current signal. Preferably, the current signal is generated by a measuring resistor arranged in the intermediary circuit of the frequency converter.

The object is also reached by means of a method for generating an over current signal.

BRIEF DESCRIPTION OF THE DRAWINGS

In the following, the invention will be explained on the basis of the drawings, showing.

DETAILED DESCRIPTION OF THE PREFERRED EMBODIMENTS

Figure 1:
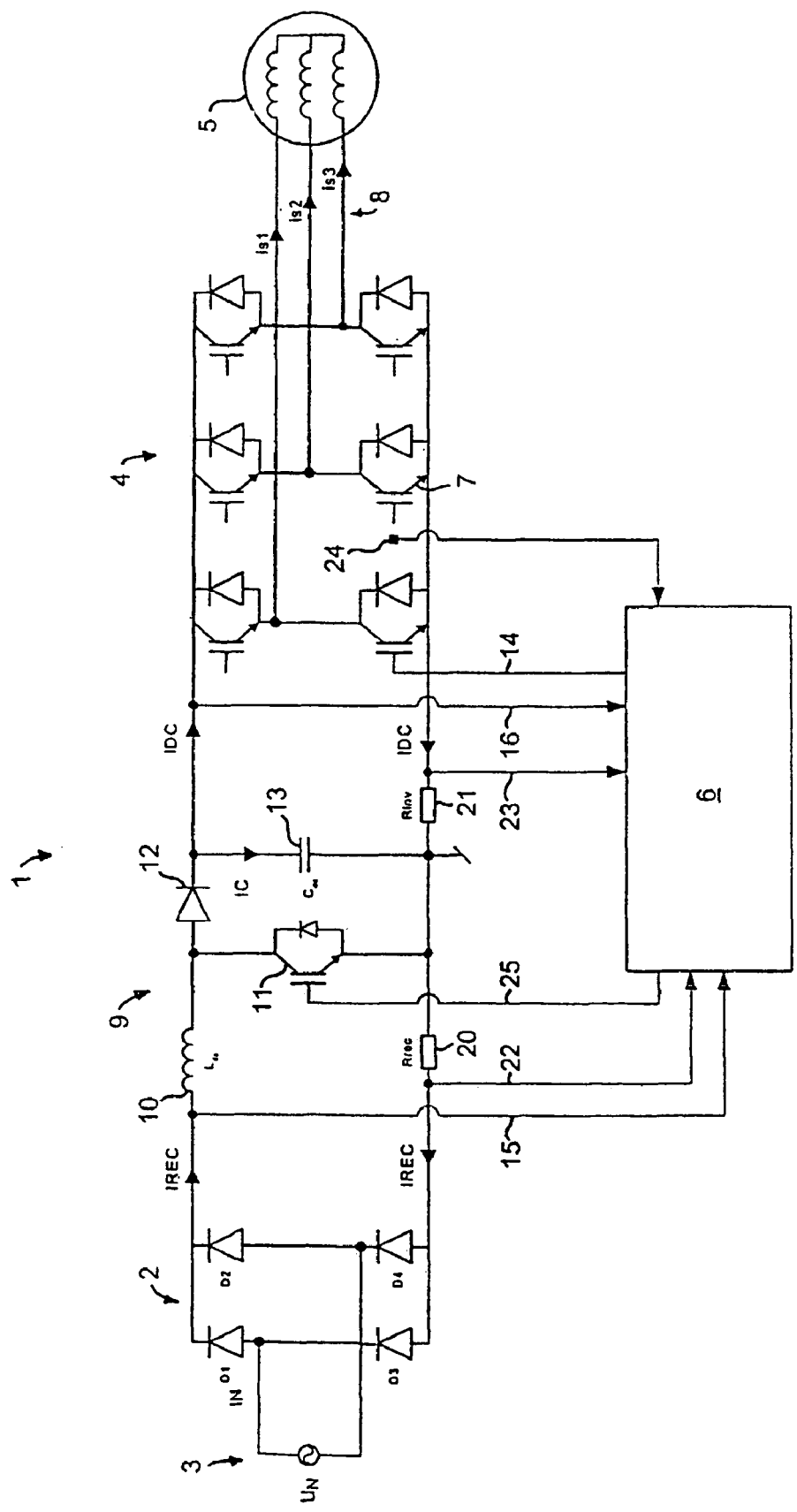
FIG. 1 shows the electronic circuit for a frequency converter with an electric motor connected

The frequency converter 1 has a rectifier 2 that is connected to a supply mains 3, which can have one of the standard voltages 115V, 230V or any other value. In the following, "nominal voltage" means the specified value, whereas the "actual voltage" means the real, available voltage. The frequency converter is built into a washing machine, and the supply mains is here shown as one-phase mains, but in principle also more phases are possible. A three-phase motor 5 is connected to an inverter 4, and the inverter is controlled by a control device 6. The control device contains memory elements (RAM) and can be made as a micro controller, DSP (Digital Signal Processor) or ASIC (Application Specific Integrated Circuit) with integrated or external memory. In a known manner the rectifier converts the alternating voltage of the supply mains to a direct voltage, which via the power semiconductors 7 of the inverter, for example IGBTs (Insulated Gate Bipolar Transistor), is reconverted to an alternating voltage on the motor lines 8. A temperature sensor 24 is arranged near the power semiconductors. A boost converter 9 comprising a coil 10, a switch 11, a diode 12 and a capacitor 13 is used to adjust the intermediary circuit voltage $U_{dc}$ to a substantially constant value of 350V, so that it is possible to connect the inverter to one of several mains voltages. Though a boost converter is preferred, a buck converter or a sepic converter might also be used. The control device 6 measures the voltage before and after the boost converter via the signal lines 15 and 16, and measures the current in the minus conductor before and after the boost converter via two measuring resistors 20 and 21 and the signal lines 22 and 23. The switch 11 is connected to the control device via the signal line 25. At the same time, the boost converter acts as a Power Factor Corrector (PFC), working in a manner known by making the current in the boost coil follow the curve shape of the rectified mains voltage. The power factor on the mains supply side is very close to 1. Instead of using a boost converter, it is also possible to use a controlled rectifier to obtain the adjustment of the intermediary circuit current, but it is slightly more difficult to obtain a high power factor. For a one-phase mains supply, a controlled rectifier can consist of two or four thyristors which are connected to the control device.

Figure 2:
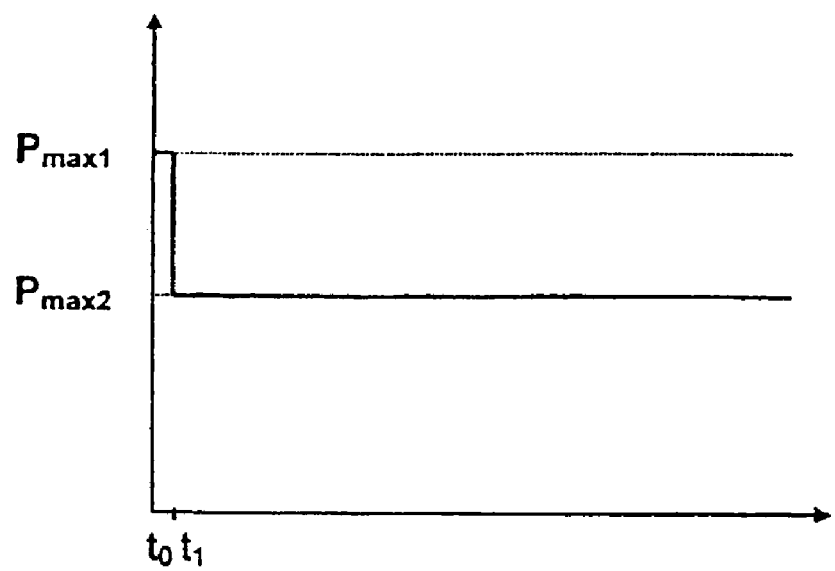
FIG. 2 shows a first curve profile for the power limitation over time

The invention works as follows. Assuming a motor size of 750 W, a mains voltage $U_N$ of 230V will result in a mains current $I_N$ of about 4.8 A as input current for the rectifier. If instead the mains voltage were 115V, the same motor load would cause an input current of about 9.6 A to fulfil the power demand of the motor. Unless the rectifier 2 and the coil 10 have been dimensioned accordingly, they will either be damaged, or the coil will generate a very high loss heat, which can damage the remaining electronics. Further, the core of the coil may be saturated, which results in loss of self-induction. This will cause high peak currents, which will result in further increased losses, which may damage the semiconductors. Thus the cooling is a large problem, when a frequency converter is arranged in a closed chamber in a washing machine, and this problem is aggravated, when the mains voltage is low. In a possible first embodiment the control device adapts the output power of the frequency converter by comparing a measured current $I_{rec}$ after the rectifier with a current limit value $I_{lim}$ which applies for a mains voltage of 230V. The control device adjusts the output power of the frequency converter so that the current $I_N$ of 4.8 A is not exceeded, thus limiting the maximum power output of the frequency converter to 375 W. FIG. 2 shows this situation. At the time t0, the frequency converter starts with a limit $P_{max1}$ for the maximum electrical output of 750 W. In the period from t0 to t1, which is slightly longer than the starting time, and lasts about 3 seconds, the mains voltage or the intermediary circuit voltage is detected and compared with a limit value stored in a table. If the voltage is lower than the limit value, the control device concludes that the mains voltage supply is lower than the value for which the frequency converter is dimensioned, and limits its maximum output power to $P_{max2}$ of 375 W. This value is kept constant for the rest of the operation time, during which the frequency converter under the limitation controls the speed of the electric motor within the power range up to the limited maximum output power $P_{max2}$.

As mentioned above, a direct measurement of the amplitude of the mains voltage is not required, as the amplitude of the mains voltage can be calculated by the control device on the basis of the current in the rectifier and, for example, the voltage in the intermediary circuit. Nor is it necessary to know the exact amplitude of the mains voltage, as an indication of the amplitude of the mains voltage is sufficient, and this indication may for example consist of a current measurement right after the rectifier via the measuring resistor 20. The instant of a limitation of the output power may be shortly after the start of the frequency converter, for example when the boost switch 11 has started to switch and the charging of the capacitor 13 is finished and an indication of the amplitude of the mains voltage has been obtained. At this time, the control device can set a suitable limit value, which applies for the rest of the operation period of the frequency converter. This solution saves calculation power. Or, as previously mentioned, the control device can make a continuous surveillance during operation, and if the limit value is exceeded then reduce the electrical output power.

Figure 3:
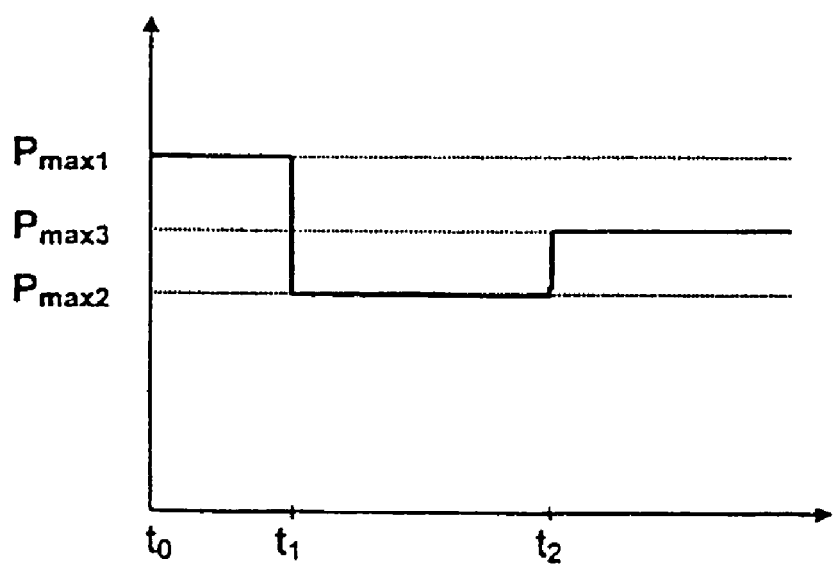
FIG. 3 shows a second curve profile for the power limitation over time

The power limiting mechanism is also activated if the mains voltage supply fluctuates. Typically, a frequency converter will be dimensioned for the nominal mains voltage plus/minus a fluctuation range, for example 230V+/−10%. However, when particularly weak supply mains are concerned, voltages down to e.g. 180V may occur, and here the input current will increase to meet the power requirements of the motor. According to the invention, however, the control device will reduce the magnitude of the maximum output power to a value which is acceptable to the frequency converter. Assuming that a motor of 1500 W is connected, a nominal mains voltage of 230V will cause a current of 9.5 A in the input circuit. FIG. 3 shows the maximum power limit $P_{max1}$ during the period t0 to t1. At the time t1, the mains supply drops to 180V, and the control device limits the output power to $P_{max2}$ of 1200 W because the limit value has been set to 9.5 A. The throttling of the maximum output power takes place during the period t1 to t2. The performance of the motor is derated, but the motor is still working rather than being stopped by the control device in order to protect the frequency converter. This corresponds to a reduction of the maximum centrifuging speed in the washing machine. Often the end user does not care whether the centrifuging takes place at 1100 RPM or 800 RPM. Other applications can also be mentioned, e.g. a pumping system, in which the pump runs at a lower speed in order that at least some water can be pumped, or a refrigeration unit working at a reduced capacity rather than stopping completely. Back in FIG. 3 it happens at the time t2 that the mains voltage supply increases slightly, namely to 200V. The control device now increases the limit of the maximum power limit $P_{max3}$ to 1320 W. This is less than what the motor can stand, but still a higher power limit than during the period t1 to t2.

Figure 4:
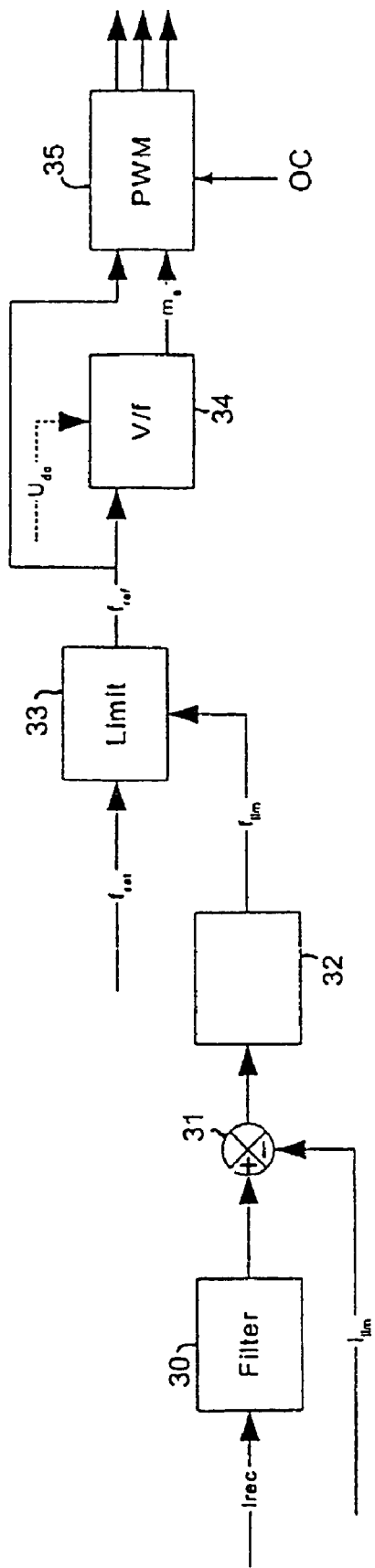
FIG. 4 shows a first embodiment of a controller used in the invention

FIG. 4 shows in a block diagram how the control algorithm, which reduces the output power, can be made. The controller shown in FIG. 4 is part of the control device 6, and the output power is reduced by means of a reduction of the motor frequency based on a measurement of the rectifier current. It is assumed that the intermediary circuit voltage $U_{dc}$ is constant. The measured rectifier current $I_{rec}$ is averaged in a filter 30 and subtracted from the current limit value $I_{lim}$ in a subtractor 31. In a converting unit 32, the current deviation is converted to a frequency $f_{lim}$, which is a frequency reduction term and expresses the magnitude, with which the motor frequency must be limited, for example 10 Hz. The converting unit 32 contains a mathematical transfer function, but it can also be made as a controller. In a frequency-converting unit 33, which contains a mathematical transfer function, the frequency limiting term $f_{lim}$ and the desired motor frequency $f_{set}$ are converted to an output signal $f_{ref}$. In the simplest embodiment the converting unit 33 is merely a subtractor but preferably it is made with a filter function for controlling the frequency change per time unit. The output signal from 33 is the reference frequency $f_{ref}$ which is led direct to a pulse width modulating unit 35, which controls the semiconductors in the inverter 4. Further, $f_{ref}$ is sent into a U/f control unit 34 which on the basis of this signal and the measured intermediary circuit voltage $U_{dc}$ generates a signal for the modulation index $m_a$, that is, the relation between the reference for the motor voltage and the intermediary circuit voltage $U_{dc}$. Alternatively, the duty cycle D can be used, i.e. the relation between on-time and period time of the semiconductors, but there exists a duty cycle for each motor winding i.e. three in total, which makes a control with D difficult. Further, the switching frequency of the inverter is kept constant.

Figure 5:
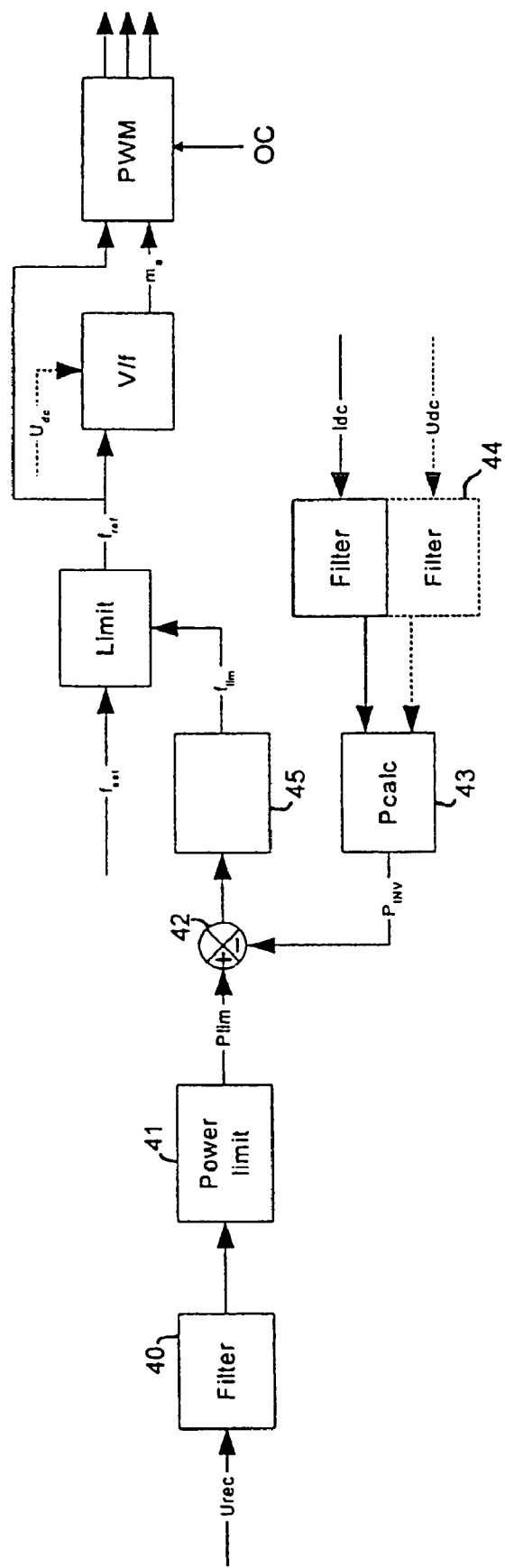
FIG. 5 shows a second embodiment of a controller used in the invention
Figure 6:
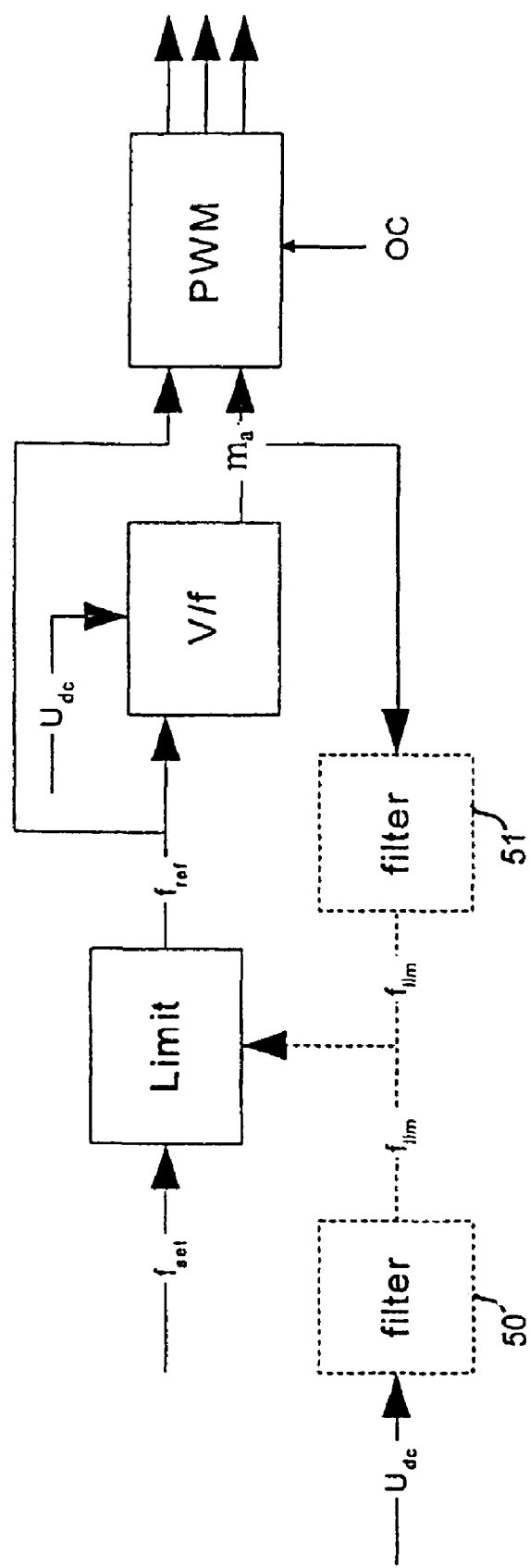
FIG. 6 shows a third embodiment of a controller used in the invention

Another control algorithm for limiting the output power of the frequency converter at low supply voltages is shown in FIG. 5. Also here it is assumed that the intermediary circuit voltage is constant. The voltage $U_{rec}$ after the rectifier is measured and smoothed in a filter 40. The signal is then led into a unit 41 which converts the voltage to a power limit value signal $P_{lim}$. The unit 41 contains a table of different sizes of the limit value $P_{lim}$, in which the voltage $U_{rec}$ is used as entry. This reference value is led to a subtractor 42, and the actual power output $P_{inv}$ from the inverter is deducted from the limit value. The actual power output is calculated in the unit 43 on the basis of filtered values of a measured intermediary circuit current $I_{dc}$. Possibly, the power calculation can also comprise a measured intermediary circuit voltage $U_{dc}$. This is shown by means of dashed lines in box 44 which contains a filter. The difference between $P_{lim}$ and $P_{inv}$ is then led into a converting unit 45, which converts the deviation to a frequency $f_{lim}$, which expresses the frequency magnitude, with which the motor frequency must be limited. The converting unit 45 is made as a regulator or as a transfer function. The remaining circuit is identical with that in FIG. 4. The power $P_{inv}$ could also be calculated on the basis of motor voltage and motor current.

While the regulators in FIGS. 4 and 5 work on the basis of a fixed intermediary circuit voltage $U_{dc}$ which is generated by the boost converter, the control circuit in FIG. 5 is based on a variable intermediary circuit voltage. The intermediary circuit voltage $U_{dc}$ is brought to vary concurrently with the supply voltage by controlling the boost switch 11 in accordance with the fluctuations of the supply voltage. Thus, the voltage after the boost converter is used as an indirect expression of the amplitude of the mains supply. The advantage of using this type of intermediary circuit instead of the intermediary circuit with constant voltage is that the intermediary circuit voltage only has to be boosted to the required value, and not higher. The larger the distance between the RMS-value of the mains voltage and the voltage in the intermediary circuit, the larger the losses. The fluctuations of the supply voltage are detected by measuring the voltage $U_{rec}$. The variable voltage $U_{dc}$ is led into a converting unit 50 which converts the voltage to a frequency $f_{lim}$, which expresses the magnitude with which the motor frequency must be limited. After that, the circuit works as described in FIGS. 4 and 5. Alternatively, the frequency limitation $f_{lim}$ can be determined as a function of the modulation index via a converting unit 51. To show the option, the boxes are drawn with dashed lines. If the mains supply voltage drops, thus pulling down the intermediary circuit voltage $U_{dc}$, it is no longer possible to supply the motor with the correct voltage, but by reducing the motor frequency as a function of either the modulation index or the intermediary circuit voltage, it is achieved that the motor can be supplied with the correct voltage, and at the same time the output power is reduced as a function of the supply voltage.

We now revert to FIG. 4 and the limit value $I_{lim}$. This limit value can be made dynamic and dependent on different parameters, for example the temperature T measured by the temperature sensor 24 (FIG. 1), and be stored as fixed values in a reference table or be continuously calculated by the control device during operation.

Figure 7:
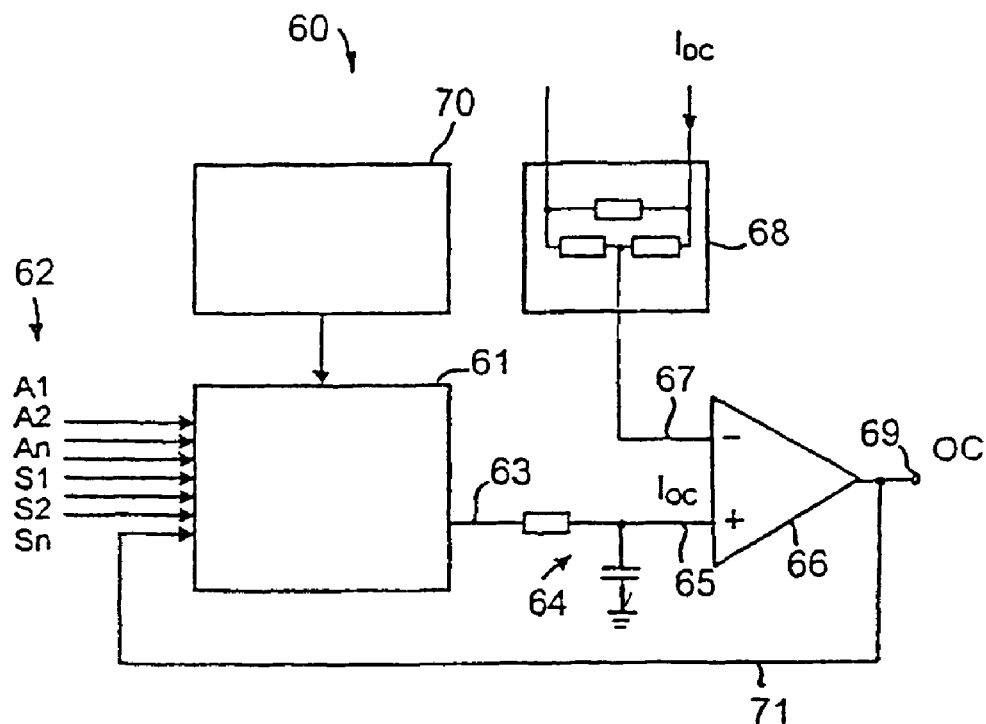
FIG. 7 shows a diagram of a circuit for the detection of over current

FIG. 4 also shows a signal OC, which is led into the pulse width modulating unit 35. This signal is an over current or a trip signal which turns off the inverter if the absolute limit for what the electronics can stand is reached. In the state of the art, the hardware current limit signal OC is most frequently generated when a fixed current limit value is exceeded, but advantageously, the current limit for tripping can be made variable and dependent on the motor frequency. FIG. 7 shows a circuit 60 which generates the over current signal OC. The circuit components 61, 63 and 70 are parts of the control device 6. A reference generator 61 generates the variable limit value on the basis of one or more variables, namely the parameters A1, A2, AN or S1, S2, Sn. "A" means application specific parameters, such as the quadratic torque load on the motor shaft of a pump, whereas "S" means control parameters such as motor frequency, motor temperature and inverter temperature. These have the reference number 62. On the output 63, the reference generator supplies a pulse width modulated signal with a suitable frequency, for example 2 kHz. The duty cycle is set at 50%, which results in a current limit reduced by 50%. In a low-pass filter 64, the PWM signal is converted to a direct voltage signal $I_{OC}$ on the input 65 to the comparator 66. The signal on the input 65 represents the variable limit value. On the input 67, there is a signal for the actual current measurement, for example a signal representing the magnitude of the intermediary circuit current. The output signal from the comparator 66 is led via the connection 71 to the reference generator, which is in the form of an FPGA or a microprocessor. Even though digital technology, which is slower than the corresponding analog technology, is used for generating the hardware current limit, an acceptable response time is achieved as the digital processing is limited to the change of the current reference signal, that is, the signal on the output 63. The circuit is sufficiently fast because generation of the over current signal takes place with analog circuitry on the output 69. A circuit 68 consisting of ohmic resistors ensures that the current signal is always standardised—in the present case, 220 mV on input 67 corresponds to the maximum permissible current in the inverter. If the signal is instead 150 mV it corresponds to an actual current utilisation of the power part of the frequency converter of 68.2%. In this way, the control device does not need to know the power size of the power part in the frequency converter. As shown in FIG. 7, the standardising circuit has been made by means of a parallel connection of two shunt resistors with the measuring resistor in the minus conductor of the intermediary circuit. The size of the measuring resistor is 18 milliohms, but the sizes of the shunt resistors differ. The shunt resistors work as voltage dividers and are in the range of a few megaohms. The standardising circuit 68 is preferably arranged on the printed circuit board of the power part and forms part of the interface to the control bord when an electrical connection of power part and control part is required.

To the manufacturer of frequency converters the standardising circuit means that the same printed circuit board containing the control part can be used for power parts of different sizes. When the direct voltage signal on input 65 exceeds the current measuring signal on input 67, the comparator output OC on line 69 goes high and indicates "over current", after which the control device 6 decides, whether or not to turn off the frequency converter. The variable current limit $I_{OC}$ is primarily expressed as a function of the actual motor frequency $f_{ref}$ and possibly one or more of the electrical parameters of the motor. These parameters—A1, A2, An and S1, S2, Sn in FIG. 5—can be the electrical power of the motor or the nominal current of the motor, which can be read direct from the motor label. Alternatively, motor parameters like stator resistance, rotor resistance and inductances, such as main field inductance and leakage inductance, can be part of the determination of the current reference characteristic. On the basis of these parameters the reference generator 61 can directly read or calculate the size of the motor which is connected to the frequency converter, and thus determine the limit value to be applied. In other words, the reference current generator 61 adapts the current limit Ioc to the motor, so that different motor sizes can be connected to the same frequency converter. This particularly applies when a motor with a smaller power rating is connected to a frequency converter with higher power rating. Thus, the user does not have to readjust the current limit; this is done automatically by the frequency converter. The information about the motor size can be entered by the user via either a keyboard, a serial communication connection, jumpers or dip-switches arranged in the factory on the control board, each dip-switch stating a motor size. However, it is particularly preferred that the control device by means of the frequency converter measures the electrical parameters of the motor and uses this information to create the limit value $I_{OC}$. Measuring the electrical parameters of the motor before operation is known, and is made by injection of DC and AC signals in the stator windings.

The variable current limit on input 65 in FIG. 7 can also be set by the reference generator on the basis of the typical load curve of the application. A memory 70 contains a table of related current limit values and the load curve, and e.g. in a pump application the curve will be parabolic. In another example, in which the current reference characteristic is a sole function of the inverter temperature which is measured by the sensor 24 (FIG. 1), the course of the curve is a negative parabola having its peak at 0° C. and decreasing at increasing temperature. In the example described, the current reference can e.g. follow this characteristic:

$$I_{OC} = -0.0085 \cdot T^2 + 100 \tag{1}$$

where T is the temperature and $I_{OC}$ is the current reference signal. In practice, the curve will be made piecemeal linear so that $I_{OC}$ has a fixed, constant value up to about 90° C., after which the curve will fall concurrently with the increasing temperature. The transfer function (1) can be realised as a function in the microprocessor or as a lookup table.

Figure 9:
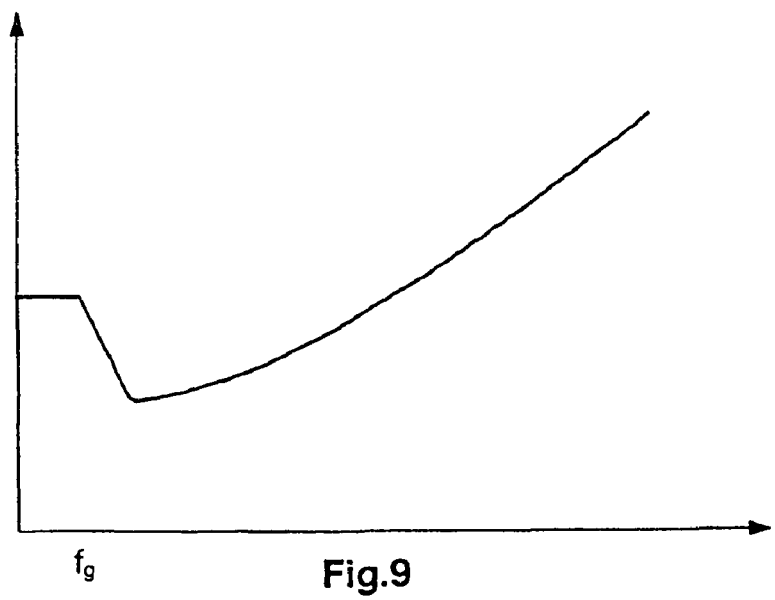
FIG. 9 shows a curve profile of an over current limit value as a function of the motor frequency

As previously mentioned, the current reference signal can also be made dependent on the motor frequency or the reference signal of the motor frequency ($f_{ref}$ in FIG. 4). The characteristic will then be as shown in FIG. 9, where the current limit is increased during the start of the motor until a limit frequency fg is reached.

Figure 8:
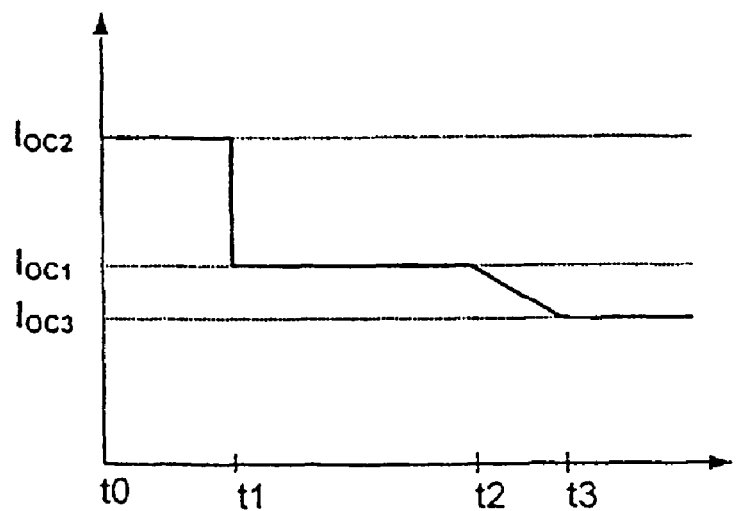
FIG. 8 shows a curve profile over time of an over current limit value

Further, the reference generator can vary the current limit during the start of the motor as a function of time. FIG. 8 shows a characteristic course of the current limit $I_{OC}$ from the start until a certain time of the operation has lapsed. Via a dipswitch on the control board the current limit has been set at $I_{OC1}$ which matches a certain motor size. In reality, the frequency converter is able to supply a much larger current, but the power rating of the motor is smaller. In the period t0-t1, the reference generator 61 increases the limit value to $I_{OC2}$ to permit a larger starting current to pass without causing tripping. At the time t1, the reference generator reduces the current limit to $I_{OC1}$ again. At the time t2, the ambient temperature increases, which causes a higher heat load of the electronics components, and therefore the current limit is further reduced to $I_{OC3}$. The current limit could also be reduced because of a drop in the mains voltage. The reduction during the period t2 to t3 can be either stepwise or continuous. One advantage of using the variable current limit is that the limit value $I_{OC}$ does not have to be dimensioned in accordance with the starting current, and this enables a more accurate detection of occurring malfunctions. The over current generated by a blocked rotor can have approximately the amplitude of the starting current, and in case of a fixed current limit of approximately the starting current level this over current will not be interpreted as a malfunction.

Alternatively, the current reference characteristic can be formulated with both the temperature and the motor frequency as variables.

Figure 10:
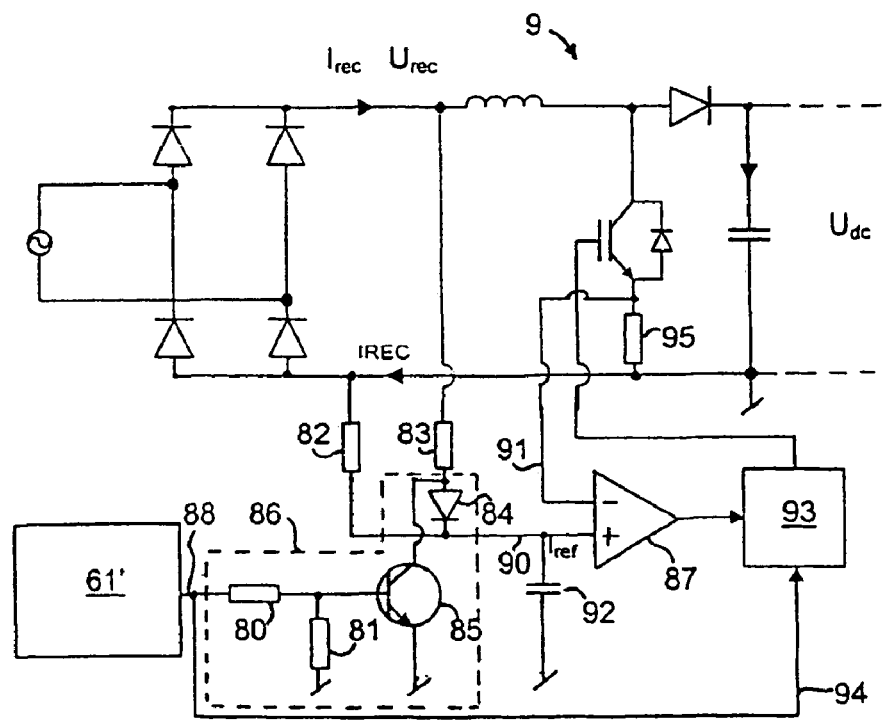
FIG. 10 shows a circuit for controlling the Power Factor Corrector

As seen in the discussion concerning FIG. 7, splitting up the electronic circuit in a digital part dealing with not time critical functions and in an analogue part performing the fast operation gave the advantage of digital flexibility and analogue speed. In FIG. 10 this principle is elaborated further with a circuit used for controlling the boost converter 9. The boost converter performs as mentioned earlier a PFC function. A PFC control circuit consists of a (slow) voltage control loop, a multiplier, multiplying the output of the voltage control loop with the line voltage waveshape and a (fast) current control loop. The output of the multiplier is reference for the current control loop. The current control loop could be an average current control, or a peak current control. Such PFC control can be made as analogue circuit, as pure digital control (e.g. with a DSP), or as a mix of digital control and analogue circuitry Even when using a split digital-analogue configuration of the type shown in FIG. 7 for controlling the boost converter, i.e. using a microprocessor for generating a digital reference signal which is lowpass filtered into an analogue reference signal, the PFC control takes up much of the capacity of the microprocessor. Further, the resolution of the reference current waveshape generated by the microprocessor is poor, because the PWM output is only updated every, say, 1 millisecond. The 1 millisecond also causes an unwanted phase shift in the current.

This problem can be alleviated by moving the multiplier outside the microprocessor and realize it as an analogue multiplier.

This will reduce the requirement for high update rate, and thereby free up capacity in the microprocessor. Also, improvement of the waveshape resolution and reduction of the phase shift will take place. The analog multiplication can be made by PWM modulating the line waveshape signal.

The rectified voltage $U_{REC}$ in FIG. 10 is divided down to signal level by resistors 82 and 83. A PWM signal from the microprocessor 61' is via connection 88 fed through resistors 80 and 81, and gates the divided $U_{REC}$ signal on and off by means of transistor 85 and diode 84. Diode 84 ensures essentially the same impedance (approx. resistor 82) when seen from capacitor 92 in on and off state. In the off state, diode 84 compensates the voltage drop in transistor 85. In the on state, the voltage drop of diode 84 is in series with the full $U_{REC}$ voltage and therefore has no significance. Resistor 82 and capacitor 92 filters out the low frequency component of the signal on line 90. This signal is the product of the voltage $U_{REC}$ and the dutycycle given by microprocessor 61', and the signal can be visualized as a series of digital pulses having constant width but varying amplitudes. However, capacitor 92 and resistor 82 smooth the signal into a varying analogue DC-signal called $I_{ref}$ in FIG. 10. $I_{ref}$ represents that reference current to the boost converter 87, which gives in-phase current and voltage on the mains side and is compared to a signal measured with resistor 95 placed in one leg of the boost switch. The output of the comparator is sent to a signal conditioning means 93, which is again connected to the gate of the boost switch. Signal conditioning means 93 contains an RS-flip flop and an amplifier. Output of comparator 87 resets the flip flop, whereas the PWM signal from connection 88 sets the flip flop. The box 86 having dashed lines represents the muliplicator function that was earlier a functional part of microprocessor 61' but is now made with fast discrete analogue components. The circuit shown in FIG. 10 is used as a peak current controller, but could be converted into an average current controller.

Having in the above dealt with the generation of the over current signal OC on the basis of a variable current limit value, we now revert to a limitation of the output power in case of low mains voltage. Note that the current limit value $I_{lim}$ and the current reference $I_{OC}$ work independently of each other as $I_{lim}$ is an internal software current limit, while $I_{OC}$ works as hardware current limit. The main function of $I_{OC}$ is to protect the semiconductors, and the signal OC can therefore also be transferred to the boost switch 11.

As previously described, the limitation of the output power is effected through a reduction of the motor frequency by the control device 6, which is done—via the connection 14—by changing the pulse-pause ratio of the power semiconductors in the inverter 4. As a U/f control is made, also the motor voltage is reduced. This means that at the same time the intermediary circuit voltage $U_{dc}$ can be lowered to avoid an unnecessary boost of the intermediary circuit voltage. The limitation can thus be made by means of a combination of the frequency reduction and the intermediary circuit voltage reduction, as the motor demand for motor voltage falls concurrently with dropping motor frequency. The intermediary circuit voltage can be reduced by reducing the average pulse-pause ratio on the boost switch 11 as a function of the output power of the frequency converter.

A reduction of the maximum limit of the output power protects the input of the frequency converter against too high current. The speed of the motor is controlled in accordance with the mains voltage available on the input of the frequency converter. Thus, the motor can not yield the same torque as when connected to a higher mains voltage, but this reduced performance is of course taken into consideration by the OEM-manufacturer when dimensioning the system.

What is claimed is:

1. A method for controlling an electric motor by means of a frequency converter, the method comprising the steps of:
   comparing a limit value signal with one or more measured or calculated parameters; and
   limiting a maximum output power when the one or more measured or calculated parameters exceeds the limit value signal by reducing a motor frequency generated by an inverter;
   wherein the frequency converter is connectable to one of several mains voltages and a control device limits the maximum electrical output power of the frequency converter when an actual mains voltage is lower than a maximum nominal mains voltage for the frequency converter, a converter between a rectifier and the inverter is regulated to output an intermediary circuit voltage that is kept constant during operation at each one of the several mains voltages, and during said limitation of the maximum output power the frequency converter controls a speed of the electric motor within a power range up to the limited maximum output power.

2. The method according to claim 1, wherein on the basis of the one or more measured or calculated parameters the control device limits the maximum electrical output power immediately after connection of the frequency converter to a mains voltage supply, if the one or more measured or calculated parameters exceed the limit value signal.

3. The method according to claim 2, wherein the control device contains a table with limit values and that on the basis of the one or more measured or calculated parameters the control device selects a limit value signal of a desired amplitude.

4. The method according to claim 1, wherein the control device determines the limit value continuously during operation of the frequency converter.

5. The method according to claim 3, wherein the limit value signal is a current limit which is determined as a function of the motor frequency or a measured temperature, or a combination of the motor frequency and the measured temperature.

6. The method according to claim 1, wherein a reference signal for the motor frequency is generated as a difference between a desired motor frequency and a frequency reduction term, the frequency reduction term being generated on the basis of a current difference, a power difference or the intermediary circuit voltage.

7. The method according to claim 1, wherein the control device reduces both motor frequency and motor voltage.

8. The method according to claim 7, wherein the intermediary circuit voltage after the converter is also reduced.

9. The method according to claim 1, wherein the frequency converter contains a voltage or current sensor for direct or indirect detection of the actual mains voltage.

10. The method according to claim 1, wherein a first current between rectifier and converter is measured and compared to the limit value signal, and that a second current between converter and inverter is measured and compared to a second limit value, and that an over current signal is given when the second current exceeds the second limit value.

11. The method according to claim 10, wherein the second limit value is variable, and that the characteristic of the second limit value can be determined as a function of the nominal power rating of the motor, the actual motor frequency or the torque load on the motor shaft.

12. A frequency converter for controlling an electric motor, the frequency converter comprising:
    a rectifier for providing a rectifier output voltage;
    a converter for regulating the rectifier output voltage to produce an intermediary voltage;
    an inverter for inverting the intermediary voltage and generating a motor frequency; and
    a control device;
    wherein said frequency converter is connectable to one of several mains voltages, the intermediary voltage is kept constant at each one of several mains voltages and the control device limits the maximum electrical output power of the frequency converter when an actual mains voltage is lower than a maximum nominal mains voltage for the frequency converter by comparing a first limit value signal with one or more measured or calculated parameters and reducing the motor frequency generated by the inverter if the measured or calculated parameter is greater than the first limit value signal; and
    wherein a second limit value representing the hardware current limit of the inverter is adjustable during operation of the frequency converter, and that an over current signal is given if a current measuring signal exceeds the second limit value.

13. The frequency converter according to claim 12, further comprising an electronic circuit for detecting an over current condition, the electronic circuit including:
    a reference generator for generating the second limit value;
    a comparator which compares the current measuring signal with the second limit value which is generated by the reference generator, the comparator giving the over current signal once the current measuring signal is larger than the second limit value; and
    a current reference characteristic which is stored in a programmable memory element, the characteristic being dependent on at least one first variable and replaceable by a second characteristic which is dependent on at least one second variable;
    wherein the reference generator generates the second limit value as a pulse-width modulated signal on the basis of the current reference characteristic loaded from the programmable memory element.

14. The frequency converter according to claim 13, wherein the first and the second variables are chosen from a set of control parameters including motor frequency, motor temperature and inverter temperature, a set of application parameters including motor size and torque load characteristic of the motor shaft, or from a combination of a control parameter and an application parameter.

15. The frequency converter according to claim 14, wherein one or more variables of the type control parameters and/or one or more variables of the type application parameters are sent to the reference generator as input signal.

16. The frequency converter according to claim 15, wherein the motor frequency is the first variable in the current reference characteristic.

17. The frequency converter according to claim 14, wherein a parameter pair motor frequency and inverter temperature is the first variable in the characteristic.

18. The frequency converter according to claim 12, wherein the second limit value is held constantly at a first level from motor start up to a limit frequency, after which the second limit value is reduced.

19. The frequency converter according to claim 13, wherein the pulse-width modulated current reference signal is led into a low-pass filter, whose output is connected with an input on the comparator.

20. The frequency converter according to claim 14, wherein the current reference characteristic is selectable by using dip-switches or jumpers arranged in the frequency converter or by using serial communication.

21. The frequency converter according to claim 14, wherein the frequency converter measures electrical parameters in the motor and determines the current reference characteristic on the basis of these parameters.

22. The frequency converter according claim 12, wherein the second limit value is formed by a measured motor current or a measured current in the converter, and the measured current is standardised in a standardising circuit having an output, the current measuring signal being available on the standardising circuit output.

23. The frequency converter according to claim 22, wherein the standardising circuit is arranged on one of a printed circuit board comprising control electronics of the frequency converter and a printed circuit board comprising power electronics, the two printed circuit boards being electrically connected with each other.

24. The frequency converter according to claim 23, wherein the standardising circuit comprises ohmic resistors, which ohmic resistors are connected in parallel with a current signal.

25. A frequency converter for controlling an electrical motor, the converter comprising electronic control circuitry wherein a digital controller generates a PWM signal which is led to an analogue lowpass filter and converted into an analogue reference value which is a reference for a current control loop, and an analog current measurement value is a feedback value for said current control loop;

wherein the analogue reference value is led to a first input of a comparator and the analogue current measurement value is led to a second input of the comparator; and wherein the PWM signal is led into an analogue multiplier placed between the digital controller and the analogue lowpass filter, said analogue multiplier multiplying the PWM signal to a signal representing a curve profile of a mains voltage.

* * * * *